(12) United States Patent
Le Hetet

(10) Patent No.: US 8,491,829 B2
(45) Date of Patent: Jul. 23, 2013

(54) METHOD OF PRODUCING A STRUCTURAL PART MADE FROM A THERMOSETTING RESIN BY DRAWING

(75) Inventor: Thomas Le Hetet, La Chevroliere (FR)

(73) Assignee: Airbus Operations SAS, Toulouse (FR)

( * ) Notice: Subject to any disclaimer, the term of this patent is extended or adjusted under 35 U.S.C. 154(b) by 100 days.

(21) Appl. No.: 12/740,708

(22) PCT Filed: Oct. 27, 2008

(86) PCT No.: PCT/FR2008/051929
§ 371 (c)(1),
(2), (4) Date: Jul. 30, 2010

(87) PCT Pub. No.: WO2009/056751
PCT Pub. Date: May 7, 2009

(65) Prior Publication Data
US 2010/0295210 A1    Nov. 25, 2010

(30) Foreign Application Priority Data

Oct. 31, 2007  (FR) ...................................... 07 58729

(51) Int. Cl.
*B29C 70/44*   (2006.01)
(52) U.S. Cl.
USPC ....................................................... 264/258

(58) Field of Classification Search
USPC .......................................................... 264/258
See application file for complete search history.

(56) References Cited

U.S. PATENT DOCUMENTS 6,884,379 B1    4/2005   Duqueine

FOREIGN PATENT DOCUMENTS

EP          1145829 A      10/2001

*Primary Examiner* — Larry Thrower
(74) *Attorney, Agent, or Firm* — Young & Thompson

(57) ABSTRACT

A process for the production of a structural part of an aircraft, whereby the part is made of composite material that includes a thermosetting resin and that has a section profile that can be stamped, whereby the process includes:
- producing a flat blank by draping layers of supports that are preimpregnated with thermosetting resin,
- partially cross-linking the flat blank, and
- stamping the flat blank between a matrix (14) and a punch (16) that are called the equipment, each including an impression that is adapted to the shape of the surface that is in contact with the part that is to be produced and whose air gap is sized based on the part that is to be produced, wherein the equipment is heated to modulate the progress of the cross-linking at the end of the forming operation.

11 Claims, 2 Drawing Sheets

METHOD OF PRODUCING A STRUCTURAL PART MADE FROM A THERMOSETTING RESIN BY DRAWING

FIELD OF THE INVENTION

This invention relates to a process for the production of a structural part that comprises a thermosetting resin matrix, whereby said process is more particularly suited for producing stiffeners of the fuselage panels of an aircraft. The invention also relates to the composite material stiffeners that are obtained according to said process as well as to a fuselage panel that integrates said stiffeners.

BACKGROUND OF THE INVENTION

The panels of the fuselage of an aircraft generally comprise a skin that can be made of composite material as well as stiffeners in the form of sections that ensure the mechanical strength of the unit.

At the front and at the rear of the fuselage, the panels of the fuselage can have a double curvature, namely a first curvature that corresponds to the radius of the fuselage whose axis is parallel to the longitudinal axis of the aircraft and a second curvature whose axis is perpendicular to said longitudinal axis. Consequently, based on their location, the stiffeners can have a double curvature, namely a curved generatrix and a twisting for the section, or can exhibit localized joggling-type forms of unevenness, for example.

According to the embodiments, the stiffeners are connected to the skin by any known means such as riveting, gluing or co-baking.

To manufacture the stiffeners with a thermosetting resin matrix, one solution consists in producing draping from fabrics or layers of pre-impregnated fibers on a mandrel whose shape corresponds to that of the section to be obtained and then in baking the unit under vacuum so as to impart the desired mechanical properties to the stiffeners by polymerization of the resin.

According to this solution, the connection between the stiffener and the skin can be obtained by co-baking, whereby the two elements are flattened against one another during the baking.

This solution is not satisfactory because the draping operation on a three-dimensional shape is complex and is difficult to automate.

Furthermore, this solution does not make it possible to obtain high geometric precision, whereby only the surface that is in contact with the mandrel may be obtained with precise dimensions. Thus, this solution does not make it possible to obtain high precision with thicknesses and parallelism between the surface that is in contact with the mandrel and the opposite surface.

According to another problem, in the crude state, the fabric that is preimpregnated with a thermosetting resin has a period of use on the order of several days at ambient temperature. Also, the production flows should absolutely ensure the respect of the expiration period of all of the elements between the destocking time of the preimpregnated fabric and its implementation by draping and its baking. This constraint can prove problematic in the case of the production of a fuselage panel. Actually, in this case, it is necessary to produce all of the stiffeners, place them on a mandrel, drape the skin on the mandrel, and bake the unit before one of the elements has passed its expiration date.

Another solution consists in producing the sections by pultrusion. However, this technique does not make it possible to obtain stiffeners that are able to be added to a skin with a double curvature, exhibiting a rotation of sections around their axes of inertia. Furthermore, this technique makes it possible to obtain only certain orientations of the fibers. Also, the parts that are produced can be stressed only in a specific manner based on the orientation of said fibers.

In the case of parts that are produced from a thermoplastic resin matrix, it is possible to initiate the shaping of the stiffeners by forming. Such a technique is described in the document EP-1,543,942. In this case, the stiffeners are obtained from pre-consolidated blanks that are then formed after heating the latter above the melting point of the thermoplastic resin. The forming rests on the reversible transformation of the thermoplastic matrix, whereby the folds of fibers can glide relative to one another using the low viscosity of the matrix above its melting point.

This solution makes it possible to obtain high geometric precision and a level of productivity that is higher than those of other techniques.

However, the thermoplastic resins have certain drawbacks that reside within the cost of such resins and the fact that there is no industrial automated draping process that implements pre-impregnated materials that use this type of resin.

Furthermore, this technique cannot be transposed to thermosetting resin matrices. Actually, the latter hardens during polymerization in an irreversible manner, preventing any subsequent interlaminar slippage. Thus, in the case of a thermosetting resin, the interlaminar slippages can take place only in narrow slots of time and temperature, during which the polymerization of the resin has not reached a threshold beyond which said interlaminar slippages can no longer be produced. However, this time lapse is too short to make it possible to incorporate this stage in an industrial process.

SUMMARY OF THE INVENTION

Also, the purpose of this invention is to eliminate the drawbacks of the prior art by proposing a process for the production of an aircraft structural element, in particular a stiffener, comprising a thermosetting resin matrix that makes it possible to obtain a better level of productivity and to significantly increase the expiration period.

According to another objective, the process according to the invention makes it possible to obtain high geometric precision.

For this purpose, the invention has as its object a process for the production of a structural part of an aircraft, whereby said part is made of composite material comprising a thermosetting resin and has a section profile that can be stamped, whereby said process consists in:
   Producing a flat blank by draping layers of supports that are preimpregnated with thermosetting resin,
   Partially cross-linking said flat blank, and
   Stamping the flat blank between a matrix and a punch called the equipment, each comprising an impression that is adapted to the shape of the surface that is in contact with the part that is to be produced and whose air gap is sized based on the part that is to be produced,
characterized in that the equipment is heated to modulate the progress of the cross-linking at the end of the forming operation.

BRIEF DESCRIPTION OF THE DRAWINGS

Other characteristics and advantages will emerge from the following description of the invention, a description that is provided only by way of example, relative to the accompanying drawings in which:

FIG. 3D shows a portion of a panel of the fuselage of an aircraft that comprises a skin 10 that forms the aerodynamic surface of the aircraft and stiffeners 12 that ensure in particular the mechanical strength of said fuselage. A single stiffener 12 is shown in FIG. 3D.

DETAILED DESCRIPTION OF THE INVENTION

According to one embodiment, the stiffeners 12 are made of a composite material that comprises supports in the form of fibers, for example carbon fibers, immersed in a thermosetting resin matrix. By way of indication, the composite material can comprise up to 60% by volume of supports. The skin 10 is preferably also made of composite material.

According to its location, a panel can have a double curvature, in particular if it is placed at the front or at the rear of the fuselage. Thus, for these panels, the longitudinal stiffeners that are also called smooth stiffeners have a double curvature, whereby a first curvature corresponds to the radius of the fuselage of which the axis is parallel to the longitudinal axis of the aircraft and a second curvature of the axis that is perpendicular to said longitudinal axis.

According to certain configurations, the stiffener 12 can also exhibit localized joggling-type forms of unevenness, for example to adapt to local modifications on its support surface.

The invention is described for this type of stiffener with a double curvature because they are the most complex to produce. However, it is not limited to this application. Thus, it can be used for producing straight stiffeners, with no curvature radius, or with a single curvature radius. Likewise, this process is not limited to stiffeners that are applied against the skin of the fuselage but to all of the stiffeners that comprise a thermosetting matrix that has a section profile that can be stamped, for example, in the shape of an L, a U, an omega, etc.

According to the invention, the process consists in producing a flat blank by draping layers of supports that are preimpregnated with thermosetting resin.

This draping is preferably produced in an automated manner so as to improve productivity. The orientation of the layers is adjusted so as to facilitate the stamping operation. However, the orientation of the fibers has less influence on the feasibility of the stamping.

Figure 1:
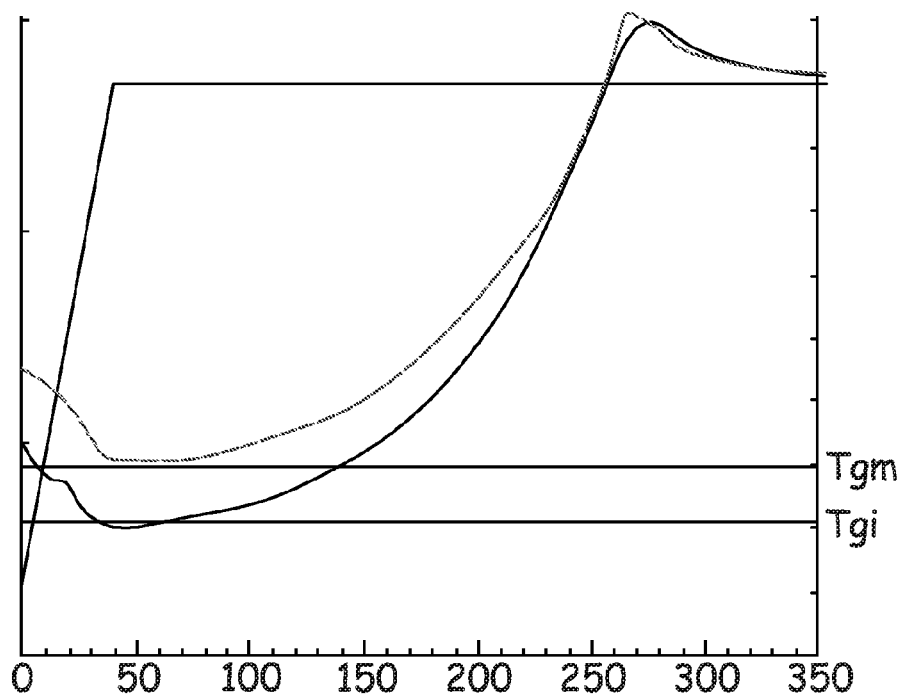
FIG. 1 is a diagram that illustrates in heavy lines the variation of the viscosity of a thermosetting resin without curing and in dotted lines the variation of the viscosity of a thermosetting resin with X % curing.
Figure 2:
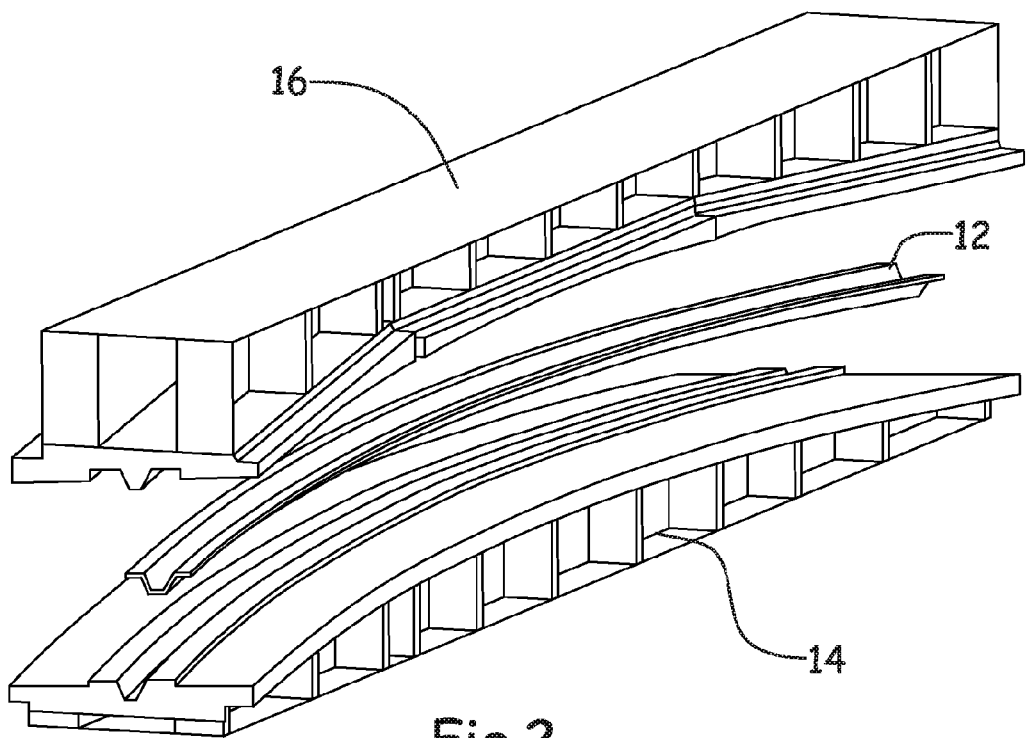
FIG. 2 is a perspective view of equipment that allows the production of a stiffener by forming.

Next, the blank or blanks undergo partial baking to obtain a semi-cooked state that is characterized by a partial cross-linking on the order of 15 to 50%. Following this partial cross-linking, the glass transition temperature Tg from which the material develops is higher. In FIG. 1, by way of example, the variation of the viscosity of a thermosetting resin without curing is shown in heavy lines, and the variation of the viscosity of the same thermosetting resin after a curing of X % (corresponding to a cross-linking on the order of X %) is shown in dotted lines. It is noted that the temperature Tgi that corresponds to the initial minimum viscosity is less than the temperature Tgm that corresponds to the minimum viscosity after partial cross-linking.

Advantageously, the percentage of the cross-linking is adjusted so that Tgm is greater than the ambient temperature of a workshop. Thus, it is no longer necessary to store blanks in refrigerated zones. This partial baking thus makes it possible to significantly increase the expiration period.

By way of example, without curing, the service life of the fabrics that are preimpregnated in the workshop is on the order of 2 to 4 weeks with a controlled temperature at 20° C.+/−2° C. and a controlled hygrometry.

After curing on the order of 30%, a cross-linking level that is less than 35% is obtained after 4 months in the same workshop, or a very delayed development.

According to another advantage, this partial cross-linking allows the subsequent forming of the part and the integration of this forming stage into an industrial process without being too restricted on the level of the expiration period of the elements that are to be assembled.

Subsequently, the flat blank is preheated so as to reach the lowest viscosity for the thermosetting resin matrix so that the laminar shearing is performed between each layer of fabric so as to prevent waves.

This preheating temperature is determined based on the rheology of the resin that is used and based on the progress of the curing of the matrix.

The preheating temperature is maintained so as to obtain a homogeneous temperature of the matrix.

The operation of preheating the blank can be carried out by using the blank or blanks in an infra-red heating furnace or using infrared radiator panels. However, the invention is not limited to these preheating techniques.

After this preheating stage, the flat blank is formed to generate a three-dimensional part. This forming stage consists in stamping the flat blank between a matrix 14 and a punch 16, each comprising an impression that is adapted to the shape of the surface that is in contact with the stiffener 12 that is to be produced. Whereby the flat blank is pressed between two rigid elements whose air gap is sized based on the part that is to be produced, a high-precision geometry is obtained, in particular a controlled thickness and parallelism between the two useful surfaces of the stiffener.

Furthermore, this forming technique makes it possible to obtain a high productivity level.

The time that is assigned for the forming operation is to be the shortest possible so as to prevent too significant an increase of the viscosity that is able to interfere with said operation.

The equipment that is used for forming can be heated prior to the forming stage to prevent the cooling of the blank. It is heated for the forming phase and after the forming phase to modulate the progress of the baking. This solution makes it possible to prevent the transfer to another piece of equipment for the baking, which makes it possible to reduce the equipment costs and limits the cooling of the part.

According to the variants, the progress of the baking can be more or less significant at the end of the forming operation. Thus, the part can comprise a totally cross-linked matrix or a partially cross-linked matrix allowing an assembly stage by co-baking. Preferably, the cross-linking percentage will be adjusted so as to obtain a good compromise between the preservation of the shape at the end of the forming that leads to selecting a high percentage and the possibility of being able to assemble the stiffener with the skin by co-baking, which leads to selecting a low percentage. To obtain a good compromise, the percentage of cross-linking after the forming operation is to be compromised preferably between 20 and 30%.

When it is desired to obtain an entirely cross-linked part, the equipment is to be at a temperature that makes it possible to keep the part at the polymerization temperature.

In this case, the shape of the part is fixed by the cross-linking at the time of polymerization, and the shape of the impression and that of the punch should be such that they correspond to the shape of the part at this polymerization temperature. It is therefore necessary to take into account the thermal expansion of the equipment at the polymerization temperature in the definition of the equipment, generally produced by machining at ambient temperature. Taking into account these scale factors is generally empirical and requires developments. Whereby the shape of the part is fixed by the polymerization, the demolding is to take place at a temperature that is close to this temperature (on the order of 130° C. to 180° C. according to the resins that are used), with the risk that the equipment does not restrict the part during its withdrawal by cooling.

When it is desired to obtain a partially cross-linked part, the equipment should be close to the demolding temperature.

Actually, when the resin is only partially but adequately cross-linked, the shape of the part will follow the dimensional return of the equipment up to the demolding temperature (on the order of 70° C.), while being geometrically very stable over time after its demolding (optionally several weeks at ambient temperature). Thus, the taking into account of the thermal expansion of the equipment in its production is facilitated, whereby the scale factors to be taken into account are lower, and the development time is reduced. Furthermore, the demolding is facilitated for the operator, whereby the part and the equipment are cooler.

Thus, if it is desired to obtain an entirely cross-linked part, the dimensions of the equipment will be determined so that the dimensions of the equipment at the baking temperature correspond to those of the part that is to be obtained. If it is desired to obtain a partially cross-linked part, the dimensions of the equipment will be determined so that the dimensions of the equipment at the demolding temperature correspond to those of the part that is to be obtained.

The matrix and/or the punch can have mobile parts that are mechanized to obtain undercut shapes.

Preferably, the closing speed of the equipment is adjusted based on the rheology of the resin so as to obtain a compromise between the quality of the laminar shearing, which leads to selecting a low speed, and maintaining the temperature, which leads to a fast speed. As a variant, the forming stage can comprise several speeds: a rapid approach speed until the punch comes into contact with the flat blank followed by a reduced working speed until the equipment closes.

The acceptable speed range is between 1 and 8 mm/s, and the optimal speed range is between 1 and 3 mm/s.

After the equipment is closed, the latter is to remain closed for a certain period at a given pressure to reduce the porosity of the part.

This pressure should not be too high to avoid the spin-drying phenomena that are characterized by the expulsion of resin in a given zone. To limit the risks of this phenomenon appearing, a solution consists in placing blocks between the punch and the matrix so as not to go down below a certain thickness.

The pressure that is to be applied is also adjusted based on the state of curing of the flat blank that is to be formed, an advanced curing that leads to a higher pressure.

The optimal pressure range is between 5 and 7 bar.

At the end of the forming stage, the part can then be cut out.

Even if the forming is preferably carried out on a partially cross-linked part, it can be performed on a raw or uncooked part.

By way of indication, a range of transformation of a raw blank in a cooked stiffener for a co-baking comprises the following stages:

An automated draping of 12 folds of carbon layers with a resin matrix M21 for obtaining flat blanks, A cutting of blanks, A preheating of the flat blank at a temperature of 130° C. (minimum viscosity temperature for a non-cross-linked matrix) for a period of 4 minutes for homogeneity of the core temperature of the blank, A transfer of the preheated flat blank to the equipment in open position, whereby the punch is removed from the matrix, A stamping in three phases, a descent with a maximum speed until the punch makes contact with the flat blank, a descent with a slower working speed, maintaining the pressure of the part at a pressure on the order of 7 bar, A baking cycle of 2 hours at 180° C. with a pressure on the order of 7 bar, A demolding of the baked part.

Once formed, the stiffener is assembled with the skin so as to obtain a fuselage panel.

The connection between the skin and the stiffener can be obtained in different ways:

An assembly operation by co-baking that is called "co-curing" between two non-cross-linked composite elements or a non-cross-linked composite element and a partially cross-linked composite element, A gluing operation called "co-bonding," whereby one of the two elements is cross-linked and the other is non-cross-linked or partially cross-linked, whereby the junction between the two elements is made by the attachment of the glue (mechanical and/or chemical), and the resin of the element that is not cross-linked or is partially cross-linked, A gluing operation called "bonding," whereby the two elements are cross-linked and the junction between the two elements is made by attaching the glue (mechanical and/or chemical).

As previously indicated, the forming stage by stamping the flat blank between two rigid elements that define a dimensional air gap makes it possible to obtain high-precision geometry. Thus, it is possible to assemble the stiffener with the skin by co-baking as illustrated in FIGS. 3A to 3D.

Figure 3A:
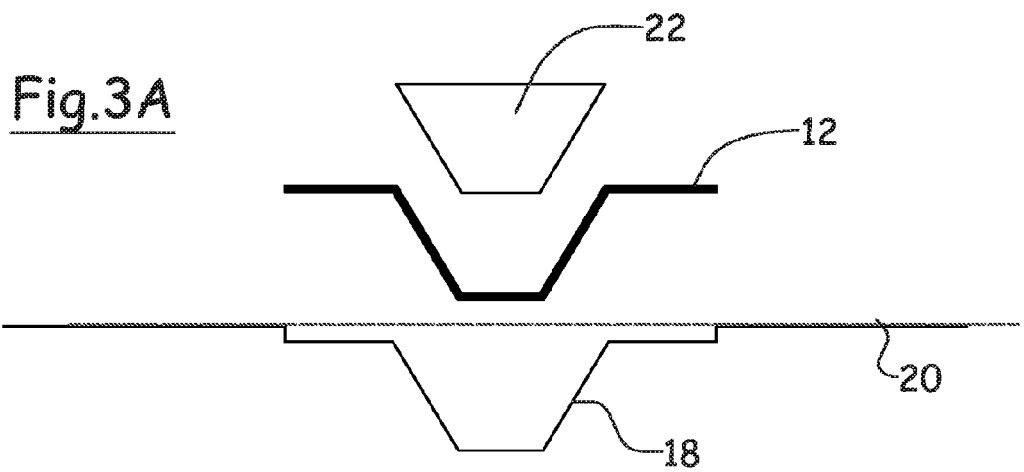
FIGS. 3A to 3D are sections that illustrate the different stages of the assembly of a stiffener with a skin to obtain an aircraft fuselage panel.

During the first stage that is illustrated in FIG. 3A, the stiffeners 12 are placed in housings 18 that are provided on the surface of a mold 20 on which the skin 10 will be draped. The forming by stamping makes it possible to obtain high dimensional precision at the level of the outside surface of the stiffener 12 that ensures close contact between the stiffener and the mold so as not to generate deformation problems during the polymerization phase.

A core 22 can be placed in the hollow of the stiffener or stiffeners 12 so as to present a surface that comes into the extension of the surface of the mold 20. The forming by stamping also makes it possible to obtain high dimensional precision at the level of the internal surface of the stiffener, in contact with the skin, ensuring the continuity of the surface of the mold for the subsequent draping of the skin as illustrated in FIG. 3B.

Figure 3B:
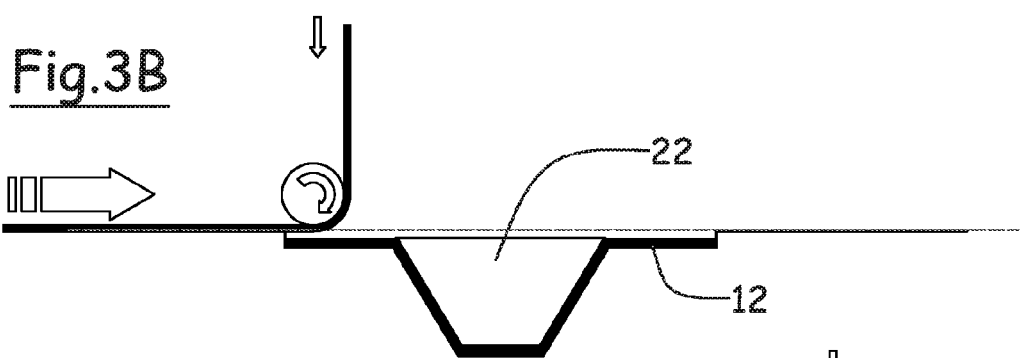
Figure 3C:
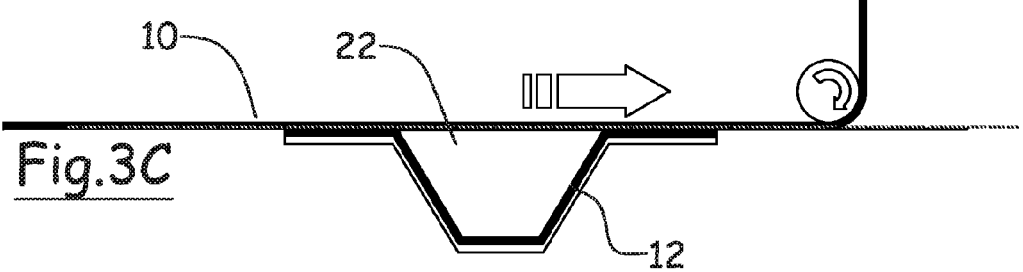
Figure 3D:
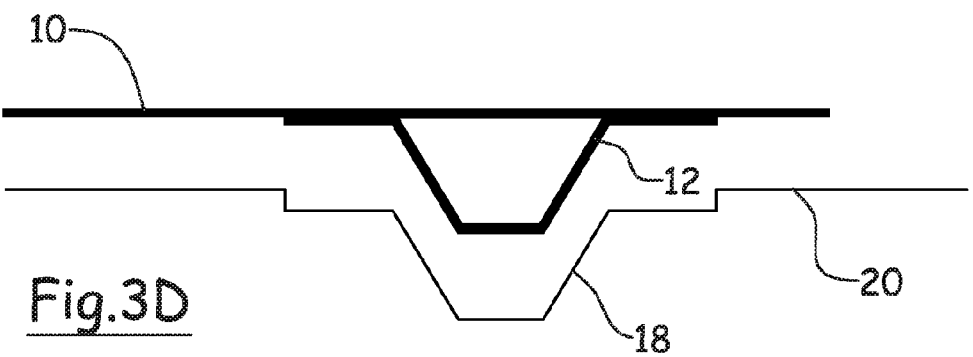

When the stiffeners are all placed, the draping operation of the skin is implemented as illustrated in FIGS. 3B and 3C. First of all, based on the type of assembly, a glue can be applied on the surfaces of the stiffeners that are in contact with the skin.

Next, the unit is subjected to a rise in temperature, in an autoclave, for example, to obtain the polymerization of the resin matrices as well as to a pressure for reducing the porosity of said matrices.

At the end of the process, a fuselage panel made of composite material is obtained.

The invention claimed is:

1. A process for the production of a structural part of an aircraft, said part being made of composite material that comprises a thermosetting resin and that has a section profile that can be stamped, said process comprising:
   producing a flat blank by draping layers of supports that are preimpregnated with thermosetting resin,
   curing the thermosetting resin to partially cross-link the resin in the flat blank, and
   performing a forming operation comprising:
   (i) stamping the partially cross-linked flat blank between a matrix and a punch, the matrix and punch being heated to a temperature of between 130° C. to 180° C., each of said matrix and punch comprising an impression that is adapted to a shape of a surface that is in contact with the part that is to be produced, and an air gap between the matrix and punch, the air gap having a size that is based on the part, and
   (ii) further cross-linking the partially cross-linked thermosetting resin in the stamped part under the temperature of between 130° C. to 180° C.,
   wherein the matrix and punch are heated during and after the forming operation at a temperature of between 130° C. to 180° C., and for a period of time and at a temperature to modulate the cross-linking of the thermosetting resin so that the part is geometrically stable upon completion of the forming operation.

2. The process according to claim 1, wherein the matrix and punch are heated until the part is demolded.

3. The process according to claim 1, comprising preheating the flat blank prior to stamping.

4. The process according to claim 3, wherein the cross-linking percentage of the part upon completion of the forming operation is between 20% and 30%.

5. The process according to claim 1, wherein a closing speed of the matrix and punch during the stamping is adjusted based on a rheology of the thermosetting resin so as to obtain a compromise between quality of laminar shearing and maintaining the temperature.

6. The process according to claim 5, wherein the closing speed is between 1 and 3 mm/s.

7. The process according to claim 1, wherein during the forming operation, the matrix and punch are closed at a pressure of between 5 to 7 bar.

8. The process according to claim 1, wherein after completion of the forming operation, the temperature of the equipment is lowered to less than 130° C. before demolding the part.

9. The process according to claim 1, wherein the equipment is heated during the forming operation at a temperature of about 180° C., at a pressure of about 7 bar, and for a time of about 2 hours.

10. The process according to claim 1, wherein the partially cross-linked flat blank is preheated to a temperature of between 130° C. to 180° C. prior to stamping.

11. The process according to claim 1, wherein the structural part is a stiffener for a fuselage panel.

* * * * *

UNITED STATES PATENT AND TRADEMARK OFFICE
CERTIFICATE OF CORRECTION

PATENT NO. : 8,491,829 B2  Page 1 of 1
APPLICATION NO. : 12/740708
DATED : July 23, 2013
INVENTOR(S) : Thomas Le Hetet It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 194 days.

Signed and Sealed this
Eighth Day of September, 2015

Michelle K. Lee
*Director of the United States Patent and Trademark Office*